United States Patent [19]
Patliff

[11] 3,783,831
[45] Jan. 8, 1974

[54] NESTING PLACE FOR PURPLE MARTIN

[76] Inventor: Edmond Lewis Patliff, 5139 Clinton Blvd., Jackson, Miss. 39209

[22] Filed: Dec. 15, 1972

[21] Appl. No.: 315,448

Related U.S. Application Data

[63] Continuation-in-part of Ser. No. 78,369, Oct. 6, 1970, abandoned.

[52] U.S. Cl. ................................................. 119/23
[51] Int. Cl. ........................................... A01k 31/00
[58] Field of Search ....................................... 119/23

[56] References Cited
UNITED STATES PATENTS

| | | | |
|---|---|---|---|
| 137,980 | 4/1873 | Vanstone | 119/23 |
| 128,538 | 7/1872 | Deknatel | 119/23 |
| 2,260,018 | 10/1941 | Garthus | 119/23 |
| 3,163,152 | 12/1964 | Stone | 119/23 |
| 3,177,849 | 4/1965 | Isenberg | 119/23 |
| D89,631 | 4/1933 | Daggett | 119/23 UX |

*Primary Examiner*—Hugh R. Chamblee
*Attorney*—Gordon W. Hueschen et al.

[57] ABSTRACT

A nesting place for the purple martin made of a synthetic resin material and comprising a hollow housing having an upper portion and a lower portion removably affixed to said upper portion. An egress and ingress opening is divided between both portions. There are means for removably affixing the lower portion to the upper portion.

8 Claims, 12 Drawing Figures

PATENTED JAN 8 1974  3,783,831

NESTING PLACE FOR PURPLE MARTIN

BACKGROUND OF THE INVENTION

This is a continuation-in-part of my copending application, Ser. No. 78,369, filed *Progue* The 1970, now abandoned.

This invention is directed to a nesting place particularly designed for the purple martin, Progue Subis. The graceful and attractive flight of the purple martin, its interesting habits, its loud musical notes, and its voracious appetite for flying insects such as flies, wasps, mosquitos, moths, flying ants, bugs, beetles, and the like, have established the purple martin as a valuable insect destroyer.

Purple martins breed in colonies, and have nested in shelters provided by man since early times when hollow gourds were hung for this purpose by the American Indians. While many types of such birdhouses are available, most of them have the conventional box-like configuration, are heavy, and are difficult to clean and maintain from year to year.

Many wooden houses provide no protection for the purple martin against cats. In addition, wooden houses are soon taken over by starlings and sparrows thus making the wooden houses uninhabitable for purple martins.

Many gourd houses suffer from the same disadvantages, especially in the inability to be easily cleaned.

It is an object of this invention to provide a purple martin nesting place made of a modern material of construction which is durable, which requires a minimum of maintenance, and which can be readily disassembled and cleaned when desired.

Still other objects will readily present themselves to one skilled in the art upon reference to the ensuing specification, the drawings, and the claims.

SUMMARY OF THE CLAIMS

The purple martin nesting place in the present invention is a hollow housing, preferably having a gourd-like shape, made of synthetic resin material such as an acrylonitrile-butadiene-styrene (ABS) resin, polyethylene, or the like. The ingress and egress opening to the nesting place is divided between the upper and lower portions of the nest. The lower portion is removably affixed to the upper portion. The lower portion has a substantially flat bottom part which has at least one drain hole. A "lip" around the opening on the upper portion prevents a twisting of two portions.

DESCRIPTION OF THE PREFERRED EMBODIMENTS

Figure 1:
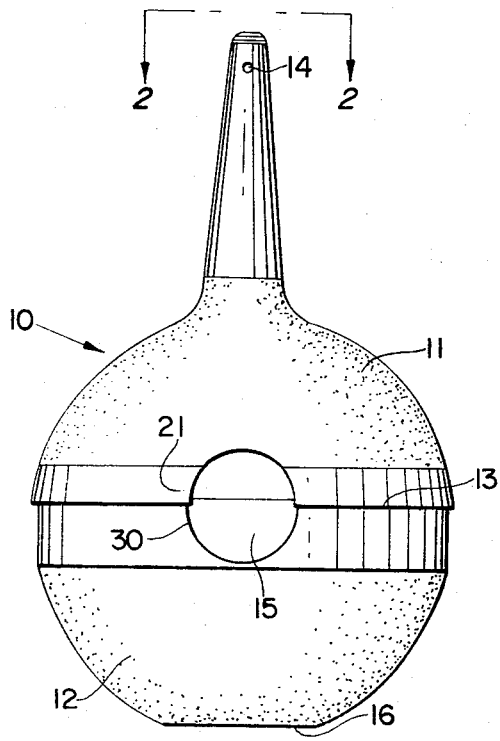
FIG. 1 is a side elevational view of a purple martin nesting place of this invention.

Referring to FIG. 1, housing 10 comprises an upper portion 11 and a lower portion 12 removably held together along line 13. In the specification and appended claims, the terms "lower" and "bottom" will be used interchangeably when referring to the lower portion 12 of the housing 10 and, likewise, the terms "upper" and "top" will be used interchangeably when referring to the upper portion 11 of the housing 10.

Housing 10 is gourd-like in shape and is provided with a hanger means 14 near the top of the upper portion or an eye attached to the top of the upper portion 11. If an eye is utilized as the hanger means, it may be conveniently molded as part of upper portion 11, or it can be provided as a separate element, for example an eye bolt suitably secured to upper portion 11 with a washer and a nut.

Figure 6:
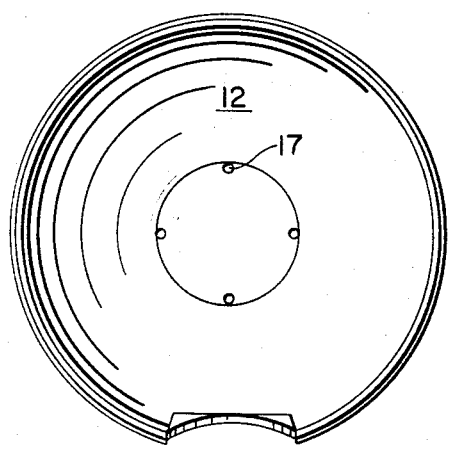
FIG. 6 is a view of the lower portion from the top.

The egress-ingress opening 15 is divided between the two portions. The lower portion 12 has a substantially flat bottom part 16 having at least one drain hole 17 (FIG. 6).

Since the ingress-egress opening 15 is divided between the two portions 11 and 12, there would be a tendency for the top portions to twist thus narrowing the opening 15 preventing the use of the birdhouse by purple martins. The opening 15 does not have to be equally divided between the two portions; however, it is preferred that the opening be approximately equally divided.

A unique arrangement of the opening 15 prevents any possible twisting of the two portions 11 and 12, thus providing the proper alignment of the two portions.

The egress-ingress opening 15 is a thickened area, that is, the opening is thicker than that of the housing 10.

Figure 2:
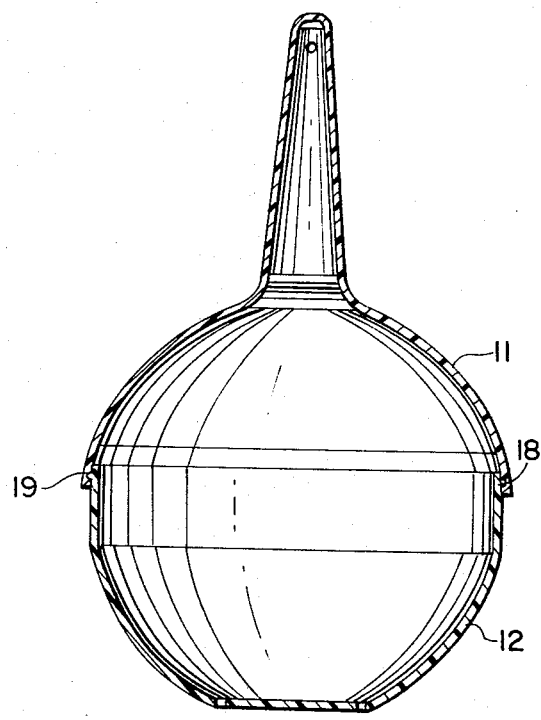
FIG. 2 is a cross-sectional view of the purple martin nesting place of this invention along the line II—II of FIG. 1.
Figure 7:
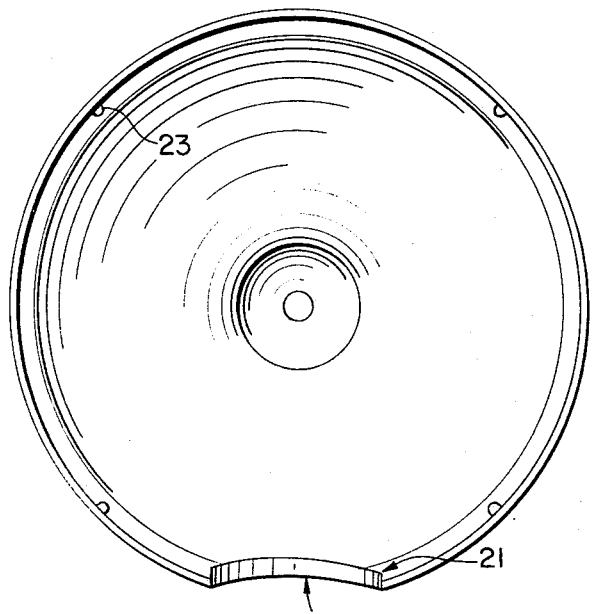
FIG. 7 is a view of the upper portion from the bottom.
Figure 8:
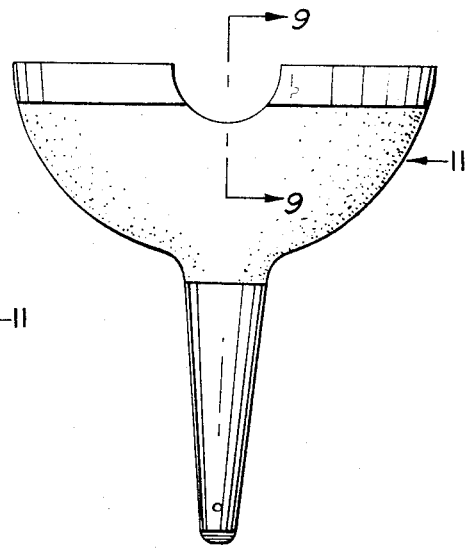
FIG. 8 is a front view of the upper portion.
Figure 9:
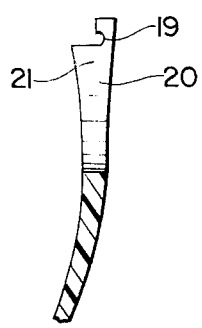
FIG. 9 is a view of the ingress-egress opening of the upper portion along line IX—IX of FIG. 8.

In FIG. 7, the egress-ingress opening 20 is clearly shown as a thicker area, thicker than the sides of portion 11. It will be noted that the opening 20 at its junction with housing 11 at approximately line 13 has an extension or "lip" 21 extending into the housing 10. This lip 21 ends above groove 19 (FIGS. 2 and 9). The utilization of the lip 21 to prevent a twisting of the two portions is seen in FIG. 1 in which the lip 21 extends slightly into the opening 15. This lip fits on the inside of the lower portion's opening 30 and "locks" the two portions in place.

In FIG. 2, one means of attaching the upper portion 11 and the lower portion 12 is shown by elements 18 and 19. The upper portion 11 has a groove 19 which runs around the housing above line 13 (FIG. 1). The lower portion 12 has a corresponding extension (tongue) 18 which also runs around housing 10. Other means for removably attaching the two portions is shown by FIG. 10 which is a screw means, by FIG. 11 which is a self-threading screw, and by FIG. 12 which is a bayonet-type mount.

Figure 12:
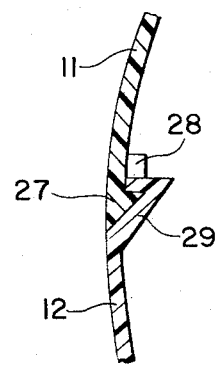
FIG. 12 is still another modification of the attachment means for the upper and lower portions.

As shown in FIG. 12, the upper portion 11 and lower portion 12 are removably held together by means of a bayonet-type mount which comprises first latch member 27, second latch member 29 and lock stop 28. First latch member 27 and lock stop 28 are molded integral with upper portion 11 and second latch member 29 is molded integral with lower portion 12. The relative positions of the first and second latch members 27 and 29 are not important and can be reversed, if desired, and provided a substantially water-tight juncture is obtained. Similarly, lock stop 28 can be molded adjacent to second latch member 29 if desired. From the standpoint of readily providing a substantially water-tight juncture, the relative positioning of latch members 27 and 29 as shown in FIG. 12 is preferred.

Figure 10:
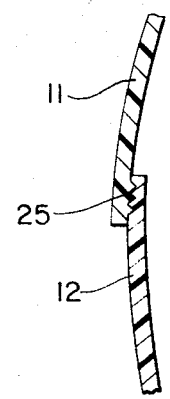
FIG. 10 is a modification of the attachment means for the upper and lower portions.
Figure 11:
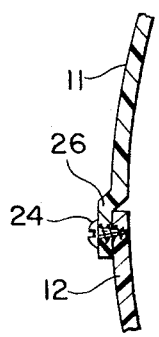
FIG. 11 is another modification of the attachment means for the upper and lower portions.

As an alternative means for removably joining together upper portion 11 and lower portion 12, mating thread means 25 can be molded into both portions as shown in FIG. 10.

In yet another embodiment of this invention, outer rim 26 (FIG. 11) of upper portion 11 is flared outwardly so as to slightly overlap the adjacent edge of lower portion 12 and the two portions then are removably secured together by means of self-threading screw 24 or the like.

Figure 4:
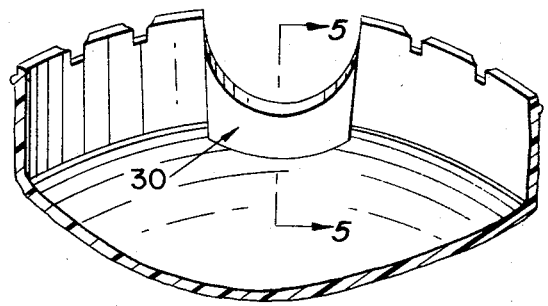
FIG. 4 is a view from inside the nest of the ingress-egress opening of the lower portion.

FIG. 4 shows the ingress-egress opening 30 of the lower portion 12. The thickened area below the opening itself tapers down in thickness as it approaches the thickness of the housing (FIG. 5).

Figure 3:
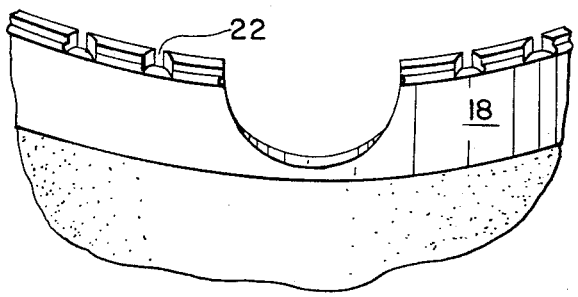
FIG. 3 is a front view of the lower portion.

Around the circumference of the top of the lower portion 12 above the extension 18 are a series of openings 22 (FIG. 3). Corresponding extensions 23 are on the top or upper portion 11. These extensions also prevent a twisting action. These extensions are not essential since the "lip" 21 prevents twisting.

Figure 5:
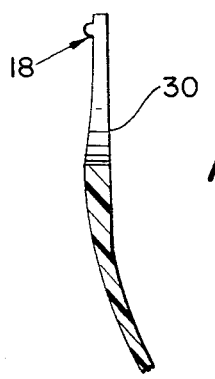
FIG. 5 is a view of the ingress-egress opening of the lower portion along the line V—V of FIG. 4.

FIGS. 5 and 6 are views of the lower portion 12. The extension 18 is clearly seen in FIG. 5. The drain holes 17 are shown in FIG. 6.

In FIG. 9, the opening 20 is shown tapering into the housing. The lip 21 stopping below groove 19 is also clearly shown.

This description of the Figures clearly shows how the purple martin housing can be easily disassembled for cleaning purposes. Reassembly is also a very simple operation due to the lip 21 with or without elements 22 and 23 which prevents twisting and aligns the two portions.

The article of manufacture of the present invention can be conveniently formed by conventional synthetic resin forming processes such as blow molding, etc. ABS resin is preferred for the purposes of this invention; however, other resins such as polyethylene, polystyrene, cellulose acetate butyrate, cellulose acetate, melamine, and the like, can be used.

The purple martin nesting places such as housing 10 are mounted on a post or the like about 12 feet to about 30 feet from the ground and are painted in a bright color, for example red, white, blue or the like. Dark colors are generally avoided to prevent an excessive build-up of heat within a housing exposed to sunlight. One or more housings can be mounted on a particular post equipped with appropriate cross-members. Preferably, four or more housings are mounted on each post, and more housings are added as the purple martin colony grows in size.

While the illustrative embodiments of the invention have been described hereinbefore with particularity, it will be understood that various other modifications will be apparent to and can readily be made by those skilled in the art without departing from the scope and spirit of the invention. Accordingly, it is not intended that the scope of the claims appended hereto be limited to the examples and description set forth herein but rather the claims be construed as encompassing all the features of patentable novelty which reside in the present invention including all features which would be treated as equivalents thereof by those skilled in the art to which the invention pertains.

What is claimed is:

1. A nesting place for the purple martin, made of synthetic resin material which comprises,
    a hollow housing having an upper portion with a curved section and a lower portion with a curved section removably affixed to said upper portion, said curved sections together forming
    an egress-ingress opening divided between said upper portion and said lower portion;
    means on said lower portion for removably affixing said lower portion to said upper portion;
    means on said upper portion for limiting the twisting of the two portions;
    a hanger means on the top of said upper portion for hanging said nesting place; and
    said lower portion having a substantially flat bottom part provided with at least one drain hole.

2. A nesting place for the purple martin according to claim 1 in which the housing has a gourd-like shape and the egress-ingress opening is approximately equally divided between said upper and lower portions.

3. A nesting place for the purple martin according to claim 2 in which said bottom part is provided with four peripherally spaced drain holes.

4. A nesting place for the purple martin according to claim 3 in which said removably affixing means is a corresponding groove and extension, said groove being around the upper portion and said extension being around the lower portion.

5. A nesting place for the purple martin according to claim 4 in which the lip around said lower portion has notches and said upper portion has extensions which correspond to and fit within said notches.

6. A nesting place for the purple martin according to claim 3 in which said removably affixing means is a bayonet-type latch.

7. A nesting place for the purple martin according to claim 3 in which said removably affixing means is a mating thread means on both the upper portion and the lower portion.

8. A nesting place for the purple martin according to claim 3 in which said removably affixing means is a plurality of set screws threadedly engaging both the lower portion and the upper portion.

* * * * *

UNITED STATES PATENT AND TRADEMARK OFFICE
CERTIFICATE OF CORRECTION

PATENT NO. : 3,783,831
DATED : January 8, 1974
INVENTOR(S) : Ratliff

It is certified that error appears in the above-identified patent and that said Letters Patent is hereby corrected as shown below:

Title page, item [76] should read as follows:

--[76] Inventor: Edmond Lewis Ratliff. --.

Signed and Sealed this

Twelfth Day of November 1985

[SEAL]

Attest:

DONALD J. QUIGG

Attesting Officer

Commissioner of Patents and Trademarks